United States Patent [19]

Rosenheck

[11] 3,849,592

[45] Nov. 19, 1974

[54] GRAPHIC DATA REDUNDANCY REDUCTION FOR TEXT AND HALF-TONE OPTICAL FACSIMILE SYSTEM

[75] Inventor: Bernard M. Rosenheck, Dix Hills, N.Y.

[73] Assignee: Litton Systems, Inc., Beverly Hills, Calif.

[22] Filed: Feb. 5, 1973

[21] Appl. No.: 329,760

[52] U.S. Cl. .......... 178/6, 178/DIG. 3, 178/DIG. 27

[51] Int. Cl. .......... H04n 1/32

[58] Field of Search .......... 178/DIG. 3, DIG. 27, 7.6, 178/7.7, 6

[56] References Cited

UNITED STATES PATENTS

| | | | |
|---|---|---|---|
| 1,608,527 | 11/1926 | Rainey | 178/DIG. 27 |
| 2,095,391 | 10/1937 | Legg | 178/6 |
| 2,180,397 | 11/1939 | Carlisle | 178/6 |
| 3,215,773 | 11/1965 | Chatten | 178/DIG. 3 |
| 3,243,507 | 3/1966 | Macovski | 178/6 |
| 3,472,959 | 10/1969 | Stillwell | 178/7.7 |
| 3,622,695 | 11/1971 | Rugaber | 178/6 |
| 3,646,256 | 2/1972 | Jacob | 178/6 |
| 3,723,641 | 3/1973 | Heinrich et al. | 178/6 |
| 3,726,993 | 4/1973 | Lavallee | 178/6 |

*Primary Examiner*—Howard W. Britton
*Assistant Examiner*—Michael A. Masinick
*Attorney, Agent, or Firm*—M. Michael Carpenter; Alan C. Rose

[57] ABSTRACT

A text and half-tone facsimile system employing graphic data redundancy reduction allowing faster transmission over a communication line of fixed capacity or preservation of transmission time over a communication line of lower capacity. Reduction is achieved by scanning a document to be transmitted at a constant rate with an optical facsimile system and storing the highly variable rate of graphic information generated from the black and white contents of the scanned document in memory storage devices, one memory device for each scan line. The stored graphic data is then processed at a highly variable rate from more than one adjacent scan line at a time by selection logic circuitry which automatically switches the resolution for compressing data from more than one line at a time when the resolution is low (high resolution for half-tone and low resolution for type). In addition, the data is further compressed by run length encoding. The processing rate of the graphic data is automatically determined so as to maintain a nearly constant data transmission rate, thus utilizing the full capacity of the transmission line.

11 Claims, 8 Drawing Figures

GRAPHIC DATA REDUNDANCY REDUCTION FOR TEXT AND HALF-TONE OPTICAL FACSIMILE SYSTEM

BACKGROUND OF THE INVENTION

The present invention relates to graphic data redundancy reduction for optical facsimile systems and, more particularly, to a facsimile system which optically scans a document at a constant rate for converting highly variable black and white graphic information into data which is compressed by removal of graphic redundancy therein. The graphic data which has been generated by the optical scanning is stored in memory devices and processed prior to transmission to the system receiver. The system processing compresses the graphic data in order to transmit digital data at a constant rate over transmission lines linking the transmitter and receiver. By processing the graphic data to more nearly transmit it at a constant speed, low cost, narrow band transmission lines such as standard voice telephone transmission lines may be utilized to link the transmitter with the recorder, where normally, broad band (48 kiloHertz) channels would be required to maintain the same transmission time. Alternatively, faster transmission can be achieved over a broad band channel.

In conventional facsimile devices, a document such as a newspaper is scanned as a person reads it — left to right top to bottom. The facsimile scanner picks up individually and sequentially millions of black and white spaces or picture elements (pixels) for sequential transmission and reproduction in the receiver. This sequential method requires a transmission frequency band of 48 kiloHertz, as wide as that needed to carry a block of a dozen voice channels in order to maintain the same transmission time.

It is well known to reduce the amount of graphic data to be transmitted in a facsimile system by encoding the white sequential pixels while transmitting the black sequential pixels on a one-to-one basis. That is, each black pixel is transmitted as a digit, for example, a binary 1; while the white sequential pixels are counted and the number of white pixels transmitted as a binary number representing the count which, in turn, represents the sequence of white pixels. This arrangement is suitable for transmitting documents which are limited to sparse black text on a white background. However, encoding only white pixels while transmitting black pixels as actual data is not satisfactory for half-tone, such as encountered when transmitting photographs upon a newspaper or magazine page, or high density text.

Another prior art arrangement which may be utilized for text material only utilizes a two-speed transmission rate. In this arrangement, a lengthy white area is scanned and transmitted at a fast rate. When alternate black and white spaces or pixels are encountered, they are scanned and transmitted at a slower rate. This arrangement does not provide for accurate graphic reproduction and is not suitable for half-tone or high density text transmission.

SUMMARY OF THE INVENTION

An object of the present invention is to provide a facsimile system which is capable of scanning documents including half-tone photographs at a high rate of speed and transmitting compressed data representing the graphic information retrieved through scanning to a receiver over a standard, low-cost, narrow band voice telephone transmission line where normally a broad band channel would be required to maintain the same transmission time.

Another object of the present invention is to provide a facsimile system that scans printed documents including half-tone photographs and transmits the scanned information at faster rates over a broad band channel normally used for high resolution facsimile transmission.

A further object of the invention described herein is to provide a facsimile system which is capable of transmitting information representing the contents of a scanned document at a constant rate over standard, narrow band transmission lines as opposed to requiring broad band lines through the utilization of a data redundancy reduction process which automatically reduces the resolution of transmitted graphic data for text portions and transmits the maximum resolution of graphic data for half-tone portions, as maximum resolution is generally required for the half-tone portions only.

In accomplishing these and other objects, there has been provided a facsimile system including means for optically scanning a document to be transmitted or for scanning a light sensitive sheet upon which the received information is to be recorded. The optical scanning system includes means for deflecting an optical scanning beam and means for converting the black and white information in the scanned document into data bits. The data is sequentially stored within a plurality of memories, each storing one scan line of the document. The stored data is read from the memories through selection circuit logic which determines whether the resolution of the data shall be reduced by majority decision logic within the selection circuit or whether the data is to be applied directly to a coding circuit. In the presence of text material, the spacial resolution of the data is automatically reduced by the majority decision logic circuitry for application to the coding circuit for further compression. When half-tone photograph material is encountered, the scanned data, without reduction, is applied to the coding logic circuit, two or more scan lines at a time by alternately reading data from first one and then another of the storage devices. This alternate reading, called herein "wobble scan," is also utilized for the reduction of text material and is the first step in causing the data from two or more scan lines to be compressed before transmission. Thus, the transmission rate of digital data across a standard telephone line is retained at a constant value while the graphic data being scanned is either compressed, if it is half-tone data, or additionally compressed by a factor of four to one if it is text data.

DESCRIPTION OF THE DRAWINGS

A better understanding of the present invention and the objects and appendant advantages thereof will be obtained by reference to the following description when considered in connection with the accompanying drawings, wherein.

DESCRIPTION OF THE PREFERRED EMBODIMENT

Figure 1:
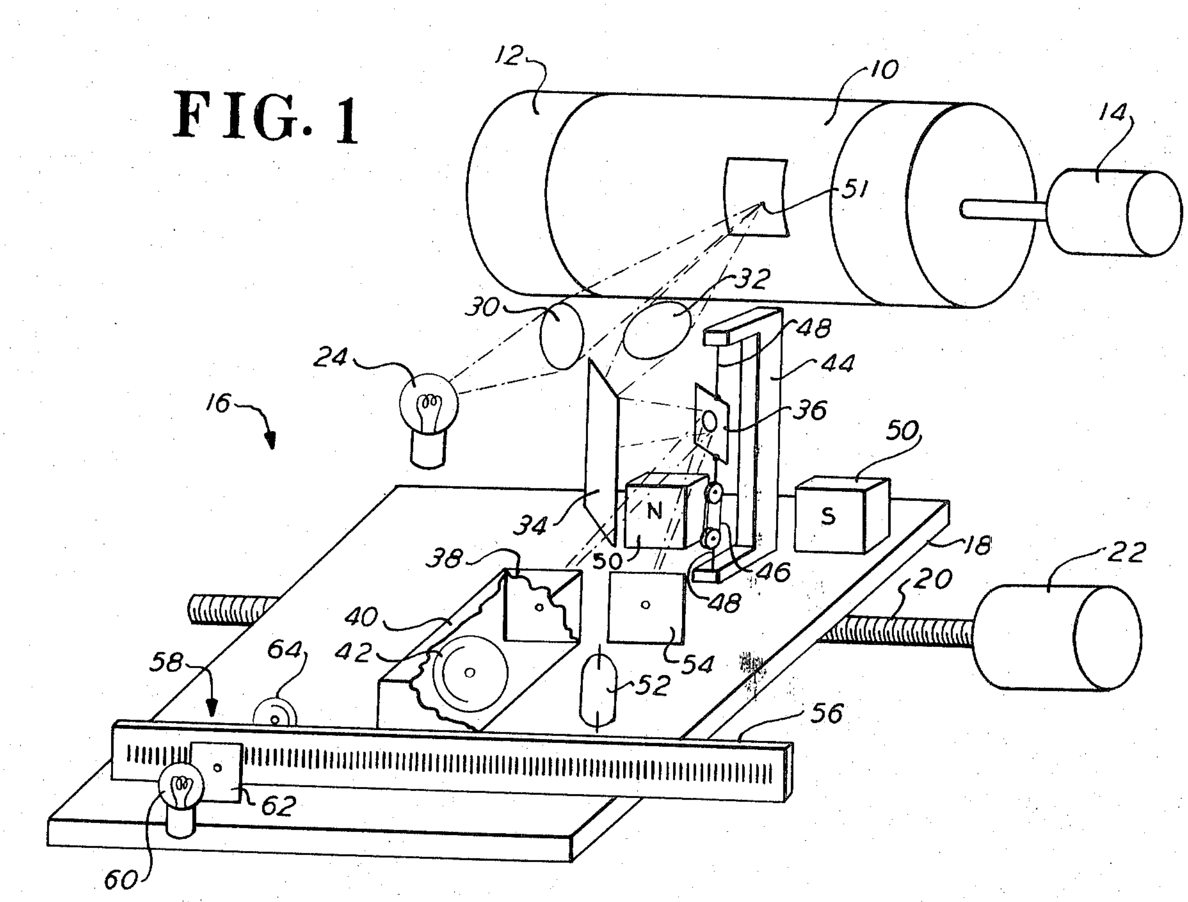
FIG. 1 is a block diagram showing the mechanical arrangement of a facsimile system, embodying the present invention.

Referring now to the drawings, FIG. 1 illustrates a facsimile system for optically scanning a document 10, such as a page from a magazine or newspaper, mounted upon the circumference of a drum 12 which is driven at a constant rotational speed by a drum motor 14, such as a synchronous motor. The drum mounted document 10 is scanned by a beam of electromagnetic energy generated from a optical scanning head 16. The optical head 16 includes a mounting frame 18 suitably attached to a lead screw 20 for drawing the frame in a direction parallel to the rotational axis of drum 12. Lead screw 20 is driven by a lead screw motor 22, such as a stepper motor.

The document 10 is illuminated by a light source 24, whose electromagnetic energy is focused through a convex lens 30 to illuminate the document 10. Light reflected from the illuminated portion of the document 10 is focused through a second convex lens 32 upon a fixed mirror 34 where it is reflected upon the surface of a low/inertia, rotatably mounted mirror 36. Focused rays from the rotatable mirror 36 are reflected toward an aperture plate 38, passed through the aperture therein into a black box 40, which mounts a photocell 42. The mirror 36 rotatably mounts upon a d'Arsonval galvanometer comprising a support frame 44 formed as an elongated C-shaped member having a coil 46 attached to each leg of the C-shaped frame by supporting filaments 48. The mirror 36 is firmly attached to the upper supporting filament 48. North and south magnetic pole pieces 50 form the magnetic field in which the coil 46 is located. Rotational deflection of the mirror 36 adjusts the optical path from the photocell 42 to the document 10 to allow for pinpoint scanning of a predetermined space or picture element (pixel) 51 during the transmission phase, as will be described hereinbelow.

During the recording phase of the facsimile system, the document 10 is replaced with a sheet of light sensitive film or paper. A source of electromagnetic light energy from a glow modulator 52 is focused through an aperture plate 54 upon the rotatable galvanometer mirror 36 and then through the fixed mirror 34 and lens 32 to the light sensitive sheet mounted upon the drum 12. In this manner, the galvanometer displaces the point 51 at which the light energy from the flow modulator 52 is focused upon the light sensitive sheet 10 for controlling the precise point of recording, as will be described hereinbelow.

The precise location of the optical scanning point 51 is controlled by a feedback arrangement. This arrangement includes the utilization of an encoder scale 56, which may be formed from a transparent rod having equally spaced indicia thereon. An encoder head 58 scans the encoder scale for providing a digital feedback signal representing the location of the optical scanning head with respect to the fixed encoder scale. The encoder head may be formed from a light source 60 which passes its electromagnetic energy through an aperture plate 62 and the encoder scale 56 for illuminating a photocell 64. As the scanning head is moved along the encoding scale 56 the indicia thereon interrupts the illumination of photocell 64 for producing a pulsed output therefrom which may be counted by a suitable digital counter.

The mechanical arrangement thus described forms the optical scanner for a facsimile system capable of scanning a document to be transmitted and converting the black and white information thus received into two-level voltage representing, for example, a positive voltage for black areas of the document and a zero voltage for white areas. Similarly, the arrangement thus described is capable of recording alternate dark or light areas upon a light sensitive sheet through the presence of a two-level voltage signal which turns the glow modulator 52 on or off for generating dark or white areas upon the light sensitive sheet which ultimately forms a copy of the document 10.

Figure 2:
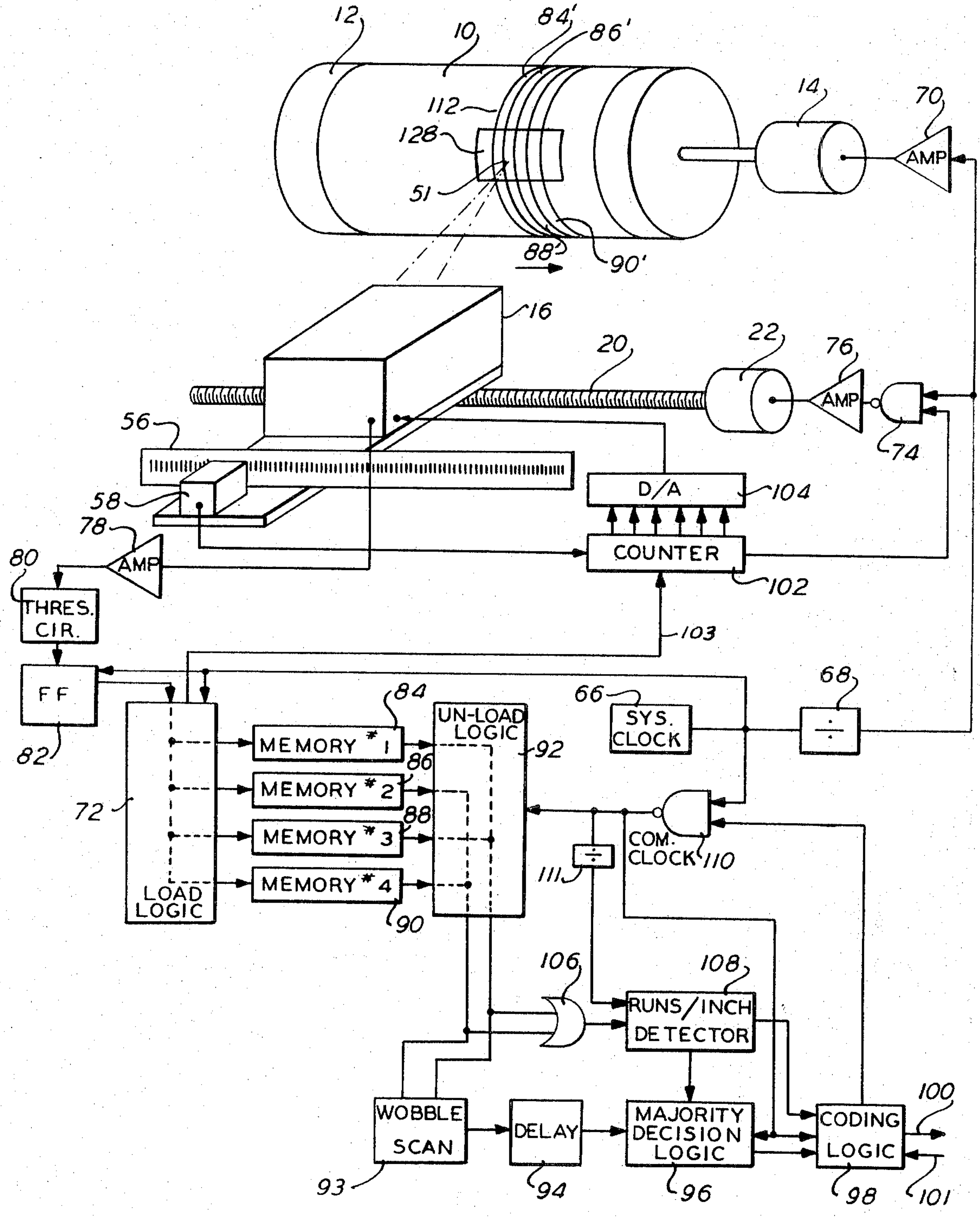
FIG. 2 is a block diagram showing the schematic arrangement of the facsimile system of the present invention in its transmit mode.

Referring now to FIG. 2, the electronic arrangement of a transmitter for the facsimile system is described. The document 10 is placed upon the drum 12 and rotated at a constant rate by the drum motor 14. The drum motor 14 is driven by a system clock 66, whose signal is divided to a suitable frequency by a divider 68 and amplified by amplifier 70. The output of the system clock 66 is also applied through the divider 68 to the input terminal of a NAND gate 74, whose output is applied through an amplifier 76 to the lead screw stepper motor 22. As discussed above, the lead screw motor 22 drives lead screw 20, which displaces the optical scanning head 16 across the document 10 as it is rotated upon the drum 12. The output from the photocell 42 within the optical scanning head 16 is applied to a signal amplifier 78, whose output connects through a threshold circuit 80, such as a Schmitt trigger, to a sample flip-flop circuit 82. The output from the sample flip-flop circuit 82 is applied to the load logic circuit 72, each circuit being under the control of the system clock 66. Load logic circuit 72 is simply four switching circuits connected generally as shown by the dashed lines within the circuit which apply the amplified and shaped signals from the photocell 42 in the form of digital data bits to four memory devices 84, 86, 88 and 90, one at a time. Each memory stores the data of one scan line around the periphery of the drum.

The output from each memory device is applied to an unload logic circuit 92 consisting of four switching circuits connected generally as shown by the dashed lines within the circuit which control the unloading of the four memories, two at a time, in pairs. The unload logic circuit 92 connects the first memory 84 and the second memory 86 through a wobble scan selection circuit 93 where the data bits are combined and applied over a single line to a delay 94 and thence to a majority decision logic selection circuit 96. Similarly, the output from the third and fourth memories 88 and 90 are combined in the wobble scan selection circuit 93 and connected over a single line through delay 94 to the majority decision logic selection circuit 96.

The output from the majority decision logic selection circuit 96 is applied to a coding logic circuit 98. Within the coding circuit 98, the digital data bits are coded into a binary code representing the number of spaces before the data bits change their voltage level. This reduces the amount of data transmitted over a data transmission line 100 connected to the coding circuit 98. The output of data from the coding logic circuit 98 is controlled by a line clock connected to the circuit at 101, while the input thereto is controlled by system clock 66. In the present embodiment, the binary code consists of a five-bit word. However, a seven-bit word or larger word may be utilized. The white space upon a document 10 in this embodiment is represented by a zero-bit. These bits are counted within the coding logic 98 and converted into a digital word representing the length of the white bits. Utilizing a five-bit code, this length can be 31 spaces long. If a seven-bit code is used, the maximum length can be 127 spaces long. In a similar manner, the length of the black spaces is also encoded into a binary word.

As mentioned above, a printed document which does not include half-tone is often transmitted by encoding the length of the white spaces and transmitting the length of the black spaces in an uncoded manner. The present invention goes beyond simply encoding both white and black spaces. The present invention provides four memory devices 84, 86, 88 and 90 for storing the black and white data generated by each scan line around the periphery of drum 12 as the optical scanning head 16 is displaced across the document 10. As will be seen, this arrangement provides for additional compression of the transmitted data beyond the compression previously accomplished by encoding the length of the scanned data. This additional compression is an areal compression wherein data from adjacent scan lines is compressed.

The present invention scans each document one line at a time at a fixed scan rate, for example, 1200 lines per inch. The black and white data generated from the first scan line 84′ is amplified, shaped and applied by the load logic 72 to the first memory 84 under control of the system clock 66 which establishes the length of each pixel 51 in each scan line, see FIG. 3*a*. When the memory 84 is completely filled with the information contained in scan line 84′, a signal is applied from the load logic circuit 72 to a counter 102 over line 103. This signal advances the counter one full count and causes a digital signal to be applied to a digital-to-analog converter 104. The signal from the converter 104 is applied to the galvanometer coil 46, which causes the galvanometer mirror 36 to be rotated slightly for focusing reflected light from the next line 86′ through the lens 32 onto the photocell 42. Thus, the energy falling upon the photocell 42 represents the information contained within scan line 86′. This information is then transmitted by the load logic circuit 72 for storage within the second memory 86. In a similar manner, the information on scan line 88′ and on scan line 90′ is respectively stored within the third memory 88 and the fourth memory 90, after previous information stored within these memories has been unloaded by the unload logic circuit 92. This unloading occurred while the memories 84 and 86 were being filled.

Figures 3A, 3B, 3C:
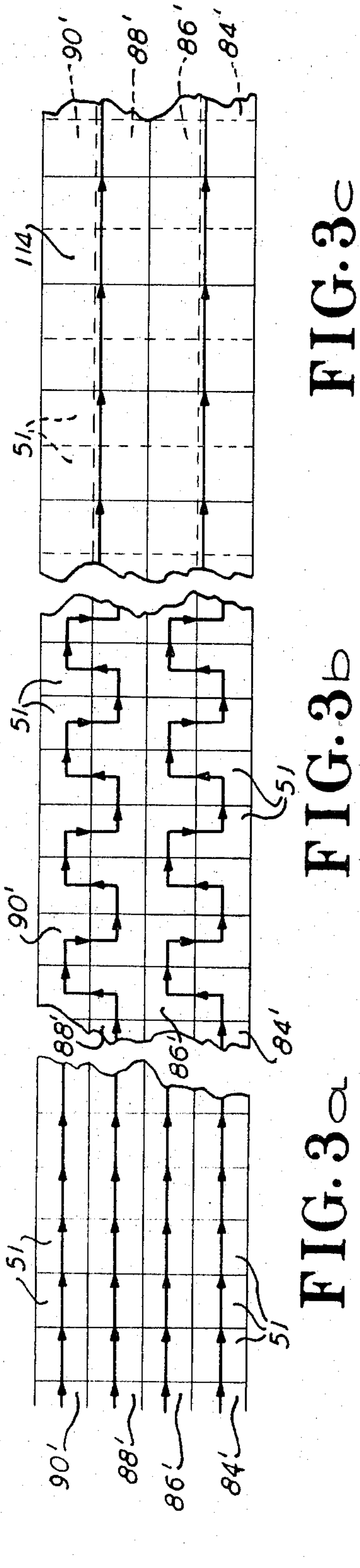
FIGS. 3a, 3b and 3c are diagrams schematically illustrating, in FIG. 3a, scanning of the document one line at a time and, in FIG. 3b and 3c, the effective scanning paths produced by electronic means in two alternate modes of the system shown in FIG. 2.

Under the control of the unload logic circuit 92, information which was stored within the first and second memories 84 and 86 one scan line at a time is simultaneously read from its respective memory and applied to the wobble scan selection circuit 93 and thence to the majority decision logic selection circuit 96. As illustrated in FIG. 3*b*, information in the form of a data bit representing a pixel 51 on scan line 84′ is first read from memory 84, then a data bit from the adjacent scan line 86′ is read from memory 86, next a second pixel from scan line 86′ is represented as a second data bit from memory 86 and, finally, a second pixel from adjacent scan line 84′ is represented as a second data bit from memory 84. This same information is applied through an OR gate 106 to a runs-per-inch detector 108. The runs-per-inch detector 108 is driven by a clock signal from the system clock 66 applied through a NAND gate 110 and a divider 111. The NAND gate 110 is also driven by a control signal from the coding logic circuit 98. The runs-per-inch detector comprises an up-down counter which compares the pulses received from the first and second memories with the divided clock pulses from the NAND gate 110 and divider 111. If the scan lines 84′ and 86′ are traversing printed text material, such as that illustrated at 112, FIG. 2, the information transmitted through the unload logic circuit 92 will be low density information causing the count applied to the runsper-inch detector to be a rate less than the pulse rate applied via NAND gate 110 and divider 111. In this situation, the output of the runs-per-inch detector goes positive for enabling the majority decision logic selection circuit 96.

Figure 5:
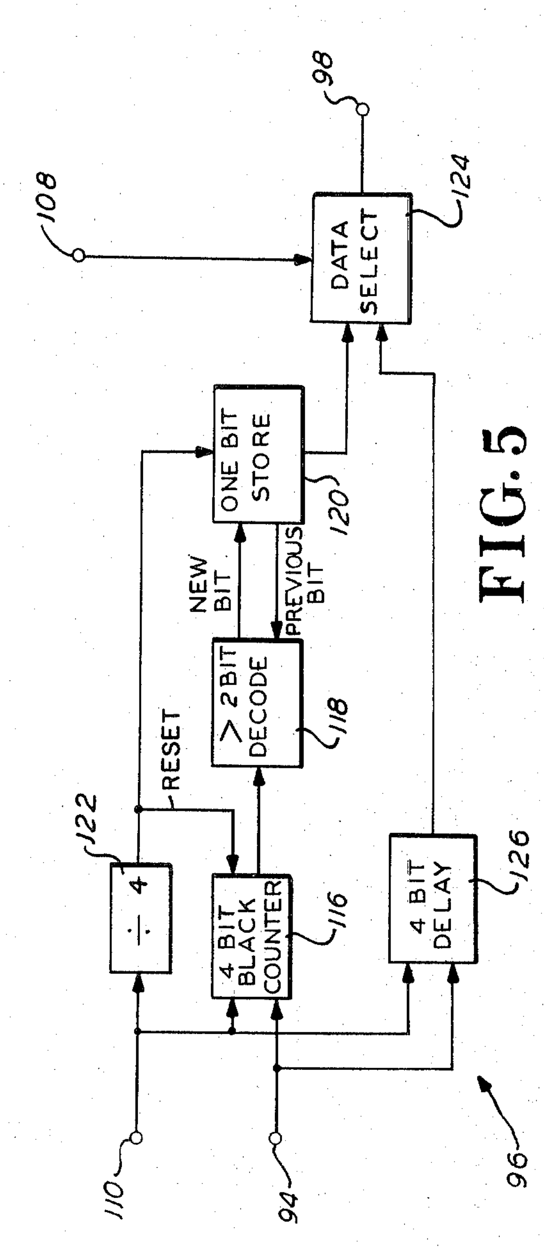
FIG. 5 is a schematic diagram showing the majoirty decision logic in greater detail.

It will be seen from FIG. 3c that scan lines 84′ and 86′ are combined by the majority decision logic selection circuit 96 when that circuit is enabled by the presence of low density data. That is, four bits of information stored within the first and second memories 84 and 86 are combined to form a four-space or four-pixel segment 114. This combination is accomplished by a four-bit counter 116 shown in FIG. 5 wherein four output data bits from the unload logic circuit 92 and the delay 94 are applied to the counter 116. Counter 116 counts the black bits only and applied its count as positive voltage pulses to a greater-than-two bit decoder 118 whose output becomes positive when it receives more than two positive bits. The greater-than-two decoder 118 comprises a counter that produces a positive voltage pulse after receipt of three positive bits which is applied to a one-bit storage circuit 120. The four-bit counter 116 is clocked by clock signals from the compression clock 110 which are also applied to a divide-by-four circuit 122. Output signals from the divide-by-four circuit 122 reset the four-bit counter 116 and the one-bit storage circuit 120. The one-bit storage circuit 120 is connected to a data selection switch 124 which also receives an input directly from delay 94 through a four-bit delay 126. When the positive enabling pulse from the runs-per-inch detector 108 is applied to the data selection switch 124, that circuit passes the signal from the one-bit storage circuit to the coding logic circuit 98 to accomplish a majority decision based on the information contained in the four bits applied to counter 116.

The result of the majority decision determines the voltage level of the four-space segment signal 114 from the majority decision logic circuit 96. This segment signal is zero, representing white, if none or one of the four bits applied to the counter 116 is a one, representing black, as the output of the greater-than-two decoder 118 remains zero or low. The signal is a one, representing black, if three or four of the four bits applied to the counter 116 are ones, as the output of the greater-than-two decoder 118 goes high. If two of the bits are ones, representing black, the output signal will assume the same value as the previous four-space segment since the previous signal from the one-bit storage circuit 120 is fed back to the greater-than-two decoder 118 to increase the count applied thereto, if the previous segment was black, or leave it unchanged if it was white.

The delay 94 is arranged to allow the runs-per-inch detector the opportunity to sense a change from normal black and white print data to a half-tone data. When a half-tone picture is scanned, as shown at 128, FIG. 2, the output from the runs-per-inch detector 108 becomes negative, due to a greater number of changing signals from the first and second memories 84 and 86 than counts from the NAND gate 110 and divider 111. This disables the majority decision logic circuit 96 by placing the data selection switch 124 in a mode which passes the alternating signals from the first and second memories 84 and 86 through delay 126 and switch 124 directly to the encoding circuit 98. This procedure repeats itself until the half-tone picture 128 has been traversed.

The data bits representing black and white information are encoded by the coding logic circuit 98 for transmission over the data transmission line 100. As the information read from the first and second memories passes beyond the area of the half-tone picture 128. The pulses applied to the runs-per-inch detector 108 decrease while the pulses from the divider 111 remain constant. This causes the count in the counter to increase for producing a positive output and returning the majority decision logic selection circuit 96 to its majority logic mode. On the next successive scans 88′ and 90′, the operation outlined hereinabove is repeated.

Figure 6:
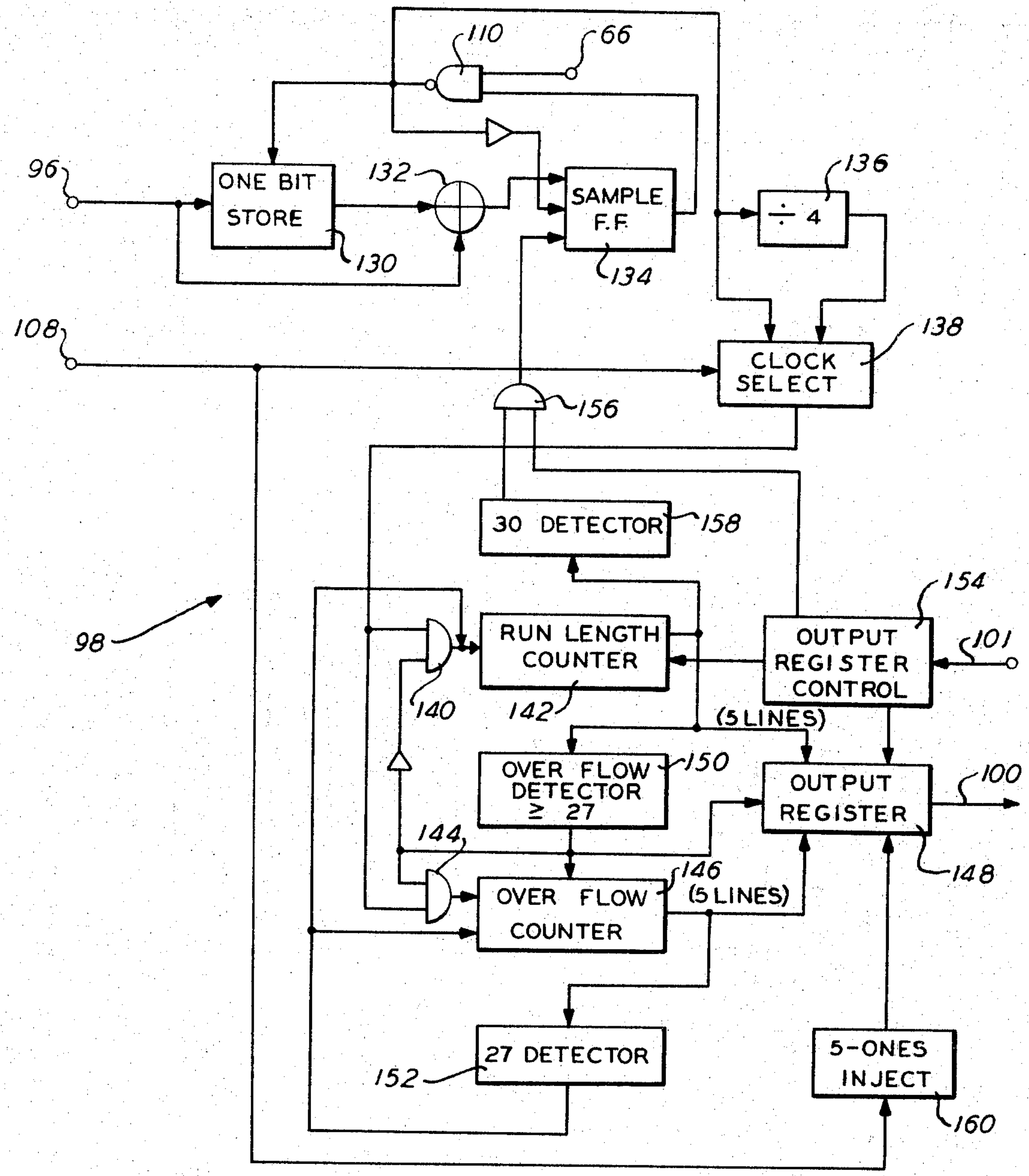
FIG. 6 is a schematic diagram showing the coding logic of the present invention in greater detail.

The coding logic circuit 98 is shown generally in FIG. 6. Data bits from the majority decision logic selection circuit 96 are applied to a transition detector formed from a one-bit storage circuit 130 which is clocked by the system clock 66, whose signal is passed through NAND gate 110 to form the compression clock. The transition detector further comprises an exclusive OR gate 132 serially connected between the output from the one-bit storage circuit 130 and a sample flip-flop 134 which is clocked by an inverted signal from compression clock 110. A second input to the exclusive OR gate 132 is made directly from the majority decision logic circuit 96. In operation, the output from the exclusive OR gate changes only when the direct input from circuit 96 differs from the delayed, last received input applied thereto from the one-bit storage circuit 130. This change of state signal stops the output from the flip-flop 134 and thereby establishes the length of run of a particular set of data bits representing white or black data. The output signal from flip-flop 134 is applied as the control signal to the compression clock, NAND gate 110. The compression clock 110 connects directly to a clock selection circuit 138 and via a divide-by-four circuit 136 to the clock selection circuit 138 which is controlled by enabling signals from the runs-per-inch detector 108.

Clock signals from the clock selection circuit 138 are applied through an AND gate 140 to a run length counter 142 and through a second AND gate 144 to an overflow counter 146. Each counter 142 and 146 is connected to an output register 148 which stores the digital signals representing the count in each counter for serial transmission as five-bit digital words over the transmission line 100. A control signal from the run length counter 142 is applied to an overflow detector 150 which becomes enabled when the count in counter 142 becomes equal to or greater than twenty-seven. In the enabled condition the detector 150 applies an inverted output signal to the AND gate 140 for disabling the input to counter 142 while applying its signal to AND gate 144 for enabling counter 146. The signal from detector 150 is also applied to the register 148 to control the two-word transmission of digital words, as will be hereinafter descirbed. An equal-to-twenty-seven detector 152, similar to detector 150, becomes enabled when the count applied thereto from counter 146 equals twenty-seven. The enabling output signal from detector 152 is applied to reset counter 146 to zero and applies an additional count pulse to counter 142 to raise its stored count to twenty-eight. It shall be understood that the values discussed herein are but one example of several encoding arrangements possible, within the present invention.

Assuming the length of a run of encoded data is less than twenty-seven bits, the counter 142 will apply its count as a five-bit digital word to the register 148 for serial transmission over line 100. A clock pulse from the line clock 101 is then applied through an output register control 154 which loads the output register 148 from counter 142, and then resets counter 142 and flip-flop 134 through an AND gate 156. The resetting of flip-flop 134 restarts the compression clock, NAND gate 110, to apply the next run of data to the one-bit storage circuit 130 and the exclusive OR gate 132. Assuming this run of data to be greater than twenty-seven bits, for example, twenty-nine bits, detector 150 is energized to stop the flow of data into counter 142 at twenty-seven counts and to allow the remainder of the last two bits to pass through gate 144 into counter 146. Register 148 is now energized to transmit two digital words. The first representing twenty-seven bits, and the second representing two bits.

It will be noted that each five-bit data word is transmitted by five line clock pulses received over line 101. Four pulses are employed to shift the word out and the fifth to update the output register 154 and reset the encoder circuit 98 at flip-flop 134 its next encoded run length. Thus, a count of fifty-three bits is transmitted by two digital words, twenty-seven from counter 142 and twenty-six from counter 146. When counter 146 counts twenty-seven, i.e., a total of fifty-four bits has been counted, an output signal from detector 152 resets the counter 146 before its digital word is transmitted to the output register 148 and a single pulse is added to increase the stored count in counter 142 to twenty-eight. All run lengths between fifty-four and eighty bits are then transmitted as a first digital word of twenty-eight (representing two times twenty-seven or fifty-four) and a remainder between zero and twenty-six. When the run length becomes eighty-one bits long, the detector 152 senses a count of twenty-seven in counter 146 to increase the count in counter 142 to twenty-nine. In a similar manner, the remainder counter 146 counts a last set of twenty-seven counts for increasing the count in counter 142 to thirty representing one hundred and eight bits (four times twenty-seven). A thirty detector 158 is then energized to remove its high control signal from AND gate 156 thus blocking the resetting of flip-flop 134 and allowing the count to continue in a new cycle until a change of state is detected.

The coding logic circuit 98 comprises the two counters 142 and 146 which count and store the data applied thereto. If a five-bit code is used, the maximum length which can be transmitted is 32 spaces. However, in the present embodiment, the binary word for zero is used for idle, if data is not available for coding. The binary word for thirty-one (five ones) is used to indicate to the receiver when the code being transmitted changes from a majority decision logic code to a wobble scan code, or back again. This is accomplished by connecting a five-ones injection circuit 160 to the runs-per-inch detector 108 and applying its output directly to the output register 148.

For a five-bit code, a scan run with a maximum of thirty spaces may be transmitted. The present invention increases this maximum value to one hundred and eight spaces by transmitting two binary words representing twenty-seven and a remainder. When the first word becomes twenty-eight, it thereby represents two twenty-seven bit lengths. In a seven-bit code, the binary word transmitted can represent up to one hundred and twenty-six spaces, keeping in mind that the one hundred and twenty-seventh digital word (seven over) is reserved for the wobble scan versus majority decision logic code while the binary word for zero is not used for coding. Zero is used for idle, if data is not available for coding in the present invention.

Figure 4:
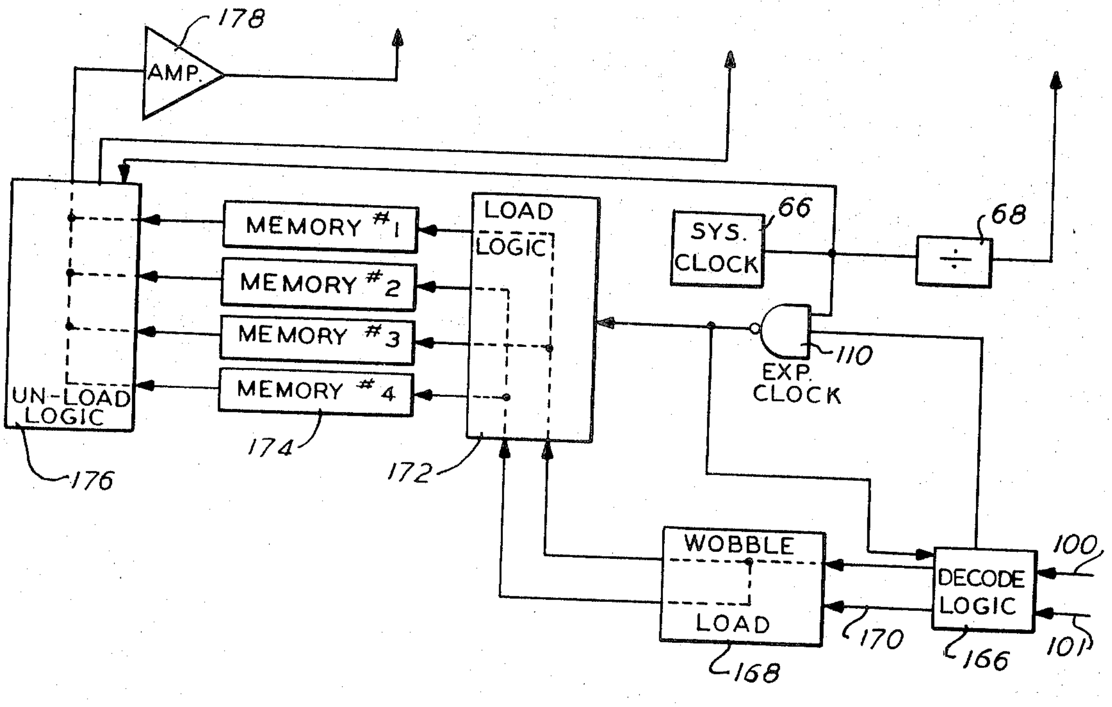
FIG. 4 is a block diagram, similar to FIG. 2, showing the facsimile system in its receive mode.

The facsimile system of the present invention is shown in a receive mode in FIG. 4, which is similar to FIG. 2 with the upper portion, i.e., mechanical portion, being identical and therefore not shown. The input information from the data transmission line 100 is applied to a decode logic circuit 166 which is also driven by the line input clock 101. The decode logic circuit 166 is connected to a receive wobble load circuit 168 which also receives an input clock signal from the decode logic circuit 166 over a line 170 to allow wobble loading of a memory pair. The selection circuit 168 connects to load logic circuit 172 which applies the incoming data to memories 174. An un-load logic circuit 176 receives the data from the memories and applies this data to a receiver amplifier 178 which is connected to the glow modulator 52. When the majority logic mode is transmitted, each segment 114 received by the wobble load 168 is used to load four bits into the first and second memories 174. When wobble scan transmission is received, each data bit is placed into the memories 174 in a wobble scan configuration, as previously described.

In either transmission or reception, the memories of the present invention receive or read out data in the same manner. That is, four scan line passes 84′, 86′, 88′ and 90′ are made one at a time across the document 10 such that memory 84 is first filled and then memory 86 is filled during respective scans. While memories 84 and 86 are alternately emptied by the wobble scan technique for either majority logic or wobble scan coding, scans 88 and 90 are made and their respective memories 88 and 90 filled. While memories 88 and 90 are emptied, the memories 84 and 86 are again filled by the next succeeding scans.

With each scan line, the galvanometer mirror 36 is displaced one line width. This displacement is accomplished by applying a signal to the counter 102, which is converted by the digital-to-analog converter 104 and applied to the galvanometer coil 46, as described above. After the counter has registered a count of four, for example, an output signal is applied to the NAND gate 74 which enables that gate and drives the stepper motor 22 at a rate determined by the system clock 66 and divider 68. The optical scanning head 16 is thus displaced with respect to the document 10 upon drum 12 by the rotational motion of the lead screw 20. The optical scanning head displacement causes the encoding head 58 to apply digital pulses to the counter 102 as the output from the light source 60 falling on the photocell 64 is interrupted by the indicia upon the encoder scale 56. Each feedback pulse causes the galvanometer mirror to deflect the optical path of the scanning head one-quarter scan line at a time in a direction opposed to the displacement caused by the lead screw. This keeps the focused optical path in the same scan line (to an accuracy of ¼ scan line) during the advancement of the optical scanning head. Experience indicates that ¼ scan line correction is non-discernable at high resolutions (1200 lines per inch). In the present embodiment, the scanning head is advanced four lines beyond the line being scanned at the time of advancement. Thus, the counter is capable of storing eight lines and, as it is further capable of dividing the lines into quarter-line increments, must be a 64-digit, six-bit counter.

In the present embodiment, the drum 12 within the transmitter is rotated at a constant speed and scanned by the scanning head 16 at 1200 lines per inch. Each space is therefore a square whose side is 1/1200 of an inch long. The black and white information detected by the photocell for each space is stored within the first memory and then within the second memory for the first and second scan lines. If the information being stored is print information, the runs-per-inch detector 108 will place the magjority decision logic selection circuit 96 in its majority logic mode. Under this condition, the information from the first and second memory is applied to the majority decision logic circuit 96 where the decision is made as to which averaged data bit should be transmitted. This decision compresses the data to be sent by a factor of four. If a scan is over an extensive white area, as most areas are on printed pages, the data is further compressed by the coding logic circuit 98. For example, if a five-bit code is used to transmit two digital words, the maximum number of four-space segments which may be transmitted in the present embodiment is 108. Thus, maximum compression becomes 432 spaces per pair of binary words. When the runs-per-inch detector 108 detects a high concentration of black versus white data, it changes the mode of the selection circuit 96 to the wobble scan mode. In this mode, the information from each memory pair is alternately applied to the coding logic circuit 98 for transmission over line 100.

At the receiver, the information transmitted under the majority logic mode is placed within the first and second memories in the same manner as the information was removed during transmission. That is, if the four-space segment is, for example, white, a first bit within the first memory is energized as zero. The equivalent second bit within the second memory is energized as a zero as is the third bit within the second memory. The fourth bit is lastly placed within the first memory as a zero. The scanning of the light sensitive sheet on the drum 12 to form a copy of the transmitted document is accomplished at 1200 lines per inch by applying the stored information from one memory at a time to the glow modulator 52. When the transmission changes to the wobble scan mode, the transmitted information is decoded and stored within the first and second memories in the wobble or alternating manner. The information is then applied from one memory at a time to the glow modulator to form individual scan lines.

The system of the present invention has been described as having four memories and scanning at a rate of 1200 lines per inch with a transmission code of five bits. Under this arrangement the majority decision logic mode transmits information as if it were scanned at 600 lines per inch. In other applications, it is suitable to scan the document to be transmitted at 600 lines per inch giving the majority decision logic mode an equivalent scanning rate of 300 lines per inch.

The present invention describes an arrangement which scans a document at a constant speed and, depending on its content, converts the information to be transmitted by compressing it by a factor of four prior to encoding the data, for additional compression. This arrangement allows the transmission lines to be utilized at their maximum capacity for speeding the transmission of data. It will be apparent to those skilled in the art that a similar arrangement may be accomplished by scanning three lines at a time, adding a fifth and sixth memory, and increasing the compression ratio to 9 to 1 by transmitting majority decision logic representing nine spaces in place of four. If the documents to be transmitted have large print and high resolution photographs, the present invention could be further modified by adding a seventh and eighth memory for transmitting majority decision logic representing one segment which comprises sixteen spaces. When a halftone photograph were sensed, the wobble scan mode would then code and transmit the full sixteen spaces. Still further modifications and variations of the present invention will become apparent to those skilled in the art after considering the present invention as described herein.

The embodiments of the invention in which an exclusive property or privilege is claimed are defined as follows:

1. A facsimile system for transmitting and receiving data representing black and white text and half-tone areas upon a document, comprising:

means for optically scanning adjacent transverse areas of said document and converting each black and white and half-tone area within each scanned transverse area of said adjacent transverse areas of said document into digital signals;

a plurality of memory means each storing said digital signals representing areas within one of said scannned transverse areas of said document;

detector means for detecting the number of variations within said digital signals;

selection means connected to said memory means to receive digital signals from more than one memory means and thereby more than one scanned adjacent transverse area at a time;

said selection means including means for averaging said stored digital signals representing scanned adjacent transverse areas of said document from said more than one memory means when said detected variations within said digital signals are few thereby areally compressing said stored digital signals for transmission and reception;

said selection means further including means for alternately selecting between said stored digital signals representing said scanned adjacent transverse areas of said document from said more than one memory means when said detected variations within said digital signals are numerous thereby passing said digital signals for transmission and reception.

2. A facsimile system for transmitting and receiving data representing the contents of a document, comprising:

means for space-by-space, line-by-line scanning of said document which converts the contents of said spaces and lines into digital data;

memory means for storing said space-by-space digital data of each adjacent scan line;

selection logic means;

switching means for applying said stored, space-by-space digital data to said selection logic means such that digital data representing a selected number of spaces greater than one space and less than a full line of spaces from first one scan line and then digital data representing the same selected number of spaces from a selected number of adjacent scan lines is applied to said selection logic means; and said selection logic means including means for averaging a selected number of said stored, space-by-space digital data from a selected number of adjacent scan lines to compress said stored digital data into an area data signal representing a plurality of spaces.

3. A facsimile system for transmitting and receiving data, as claimed in claim 2, additionally comprising:

coding means for receiving a plurality of said area data signals each representing a plurality of spaces and converting identical consecutive area data signals into a binary code for further compressing said data to be transmitted and received.

4. A facsimile system for transmitting and receiving data, as claimed in claim 3, additionally comprising:

detector means connected to said switching means for receiving said digital data and detecting the variations therein;

said detector means connected to said selection logic means to enable said means for averaging of said digital data within said selection logic means when the variations between said digital data are few; and said detector means disabling said means for averaging of said digital data within said selection logic means when said variations between said digital data are numerous and instead applying said selected number of said stored, space-by-space digital data from said selected number of adjacent scan lines to said coding means.

5. A facsimile system for transmitting and receiving data, as claimed in claim 3, additionally comprising:

gating means connecting said coding means to said switching means for applying said digital data stored within said memory means at a rate determined by said coding means, whereby the data transmitted by said facsimile system is at a constant rate.

6. A facsimile system for transmitting and receiving data, as claimed in claim 2, additionally comprising:

said scanning means including adjustable optical means for line-by-line scanning of said document;

means including switching means for transmitting said digital data representing space-by-space and line-by-line scanning of said document to said memory means;

adjusting means connected between said means including switching means and said adjustable optical means for adjusting said optical means to scan the next adjacent scan line after said memory means has completed the storage of said digital data from the preceding scan line.

7. A facsimile system for transmitting and receiving data, as claimed in claim 6, additionally comprising:

said scanning means further including a rotating drum upon which said document is mounted;

said adjustable optical means including a scanning head driven at a right angle to the rotation of said drum for coarse adjustment of said optical scan, and further including adjustable mirror means driven by an electrical input signal at a right angle to the rotation of said drum for fine adjustment of said optical scan;

said adjusting means including a digital counter and digital to analog converter for generating said electrical input signal for driving said adjustable mirror means;

said means including switching means connected to said digital counter for adjusting the count therein after each of said memory means is filled with digital data from one scan line for fine adjustment of said optical scan;

gated drive means connected to said digital counter to drive said scanning head after said digital counter reaches a predetermined count for course adjustment of said optical scan; and feedback means for sensing said coarse adjustment of said scanning head connected to said digital counter to adjust said counter and thereby said fine adjustment of said optical scan, as said course adjustment is made.

8. A facsimile system for transmitting and receiving data representing the contents of a document, comprising:

means for space-by-space, line-by-line scanning of said document including means for converting the contents thereof into digital data;

first and second memory means;

first switching means for applying said digital data to said first memory until all space-by-space digital data for one scan line is stored therein, and then for applying said digital data to said second memory until all space-by-space digital data for an adjacent scan line is stored therein;

second switching means for reading said stored digital data first from said first memory means and then from said second memory means, such that digital data representing two spaces from one scan line and digital data representing two spaces from said adjacent scan line are presented;

detector means for detecting variations between said digital data;

selection means connected to said second switching means and said detector means for averaging said two and two digital data from said adjacent scan lines when said variations therebetween are few and, when said variations are numerous, for passing said digital data as presented from said second switching means without averaging wherein said data is compressed when said data is redundant.

9. A facsimile system for transmitting and receiving data, as claimed in claim 8, additionally comprising:

coding means connected to said selection means for encoding said averaged digital data wherein further compression of said data is achieved when said data is redundant.

10. In a facsimile system for transmitting and receiving data contained on a document including means for line-by-line optical scanning of said document, means for converting each scan line into digital data, storage means for each scan line of digital data, and transmission means for transmitting said stored digital data; the improvement comprising:

areal compression circuit means connected between said storage means and said transmission means for receiving stored digital data from more than one scan line at a time and areally compressing said stored digital data by averaging said digital data from more than one scan line at a time into a single unit of digital data for transmission;

variation detector means within said areal compression circuit means connected to said storage means for detecting variations in said stored digital data;

counter means for counting a selected number of single units of stored digital data connected to said storage means;

clock means for generating timing pulses connected to said counter means;

means for dividing said timing pulses by a value equal to said selected number of single units of stored digital data connected to said counter means to reset said counter;

delay means connected to said storage means for delaying said stored digital data therefrom by said selected number of single units of stored digital data;

decoder means connected to said counter means for receiving an output count therefrom and generating an output signal when the received count from said counter means is greater than one-half of said selected number of single units of stored digital data;

single unit storage means connected to said decoder means to store the output signal generated by said decoder means and further connected to apply the last received output signal from said decoder means back to said decoder means for changing the output signal therefrom when the received count from said counter means is equal to one-half of said selected number of single units of stored digital data;

data selection means connected to said variation detector means, said delay means, and said single unit storage means for passing a single unit of digital data from said single unit storage means for transmission if said detector means detects a few variations in said stored digital data and for passing a selected number of single units of stored digital data for transmission if said detector means detects numerous variations in said stored digital data.

11. A facsimile system for transmitting and receiving data representing the contents of a document, comprising:

means for line-by-line scanning of said document including means for converting segments of each scan line into digital data;

clock means for generating clock pulses;

switching means;

transition detector means connected to said clock means and said switching means for receiving said digital data from said means for scanning under control of said clock means;

first and second counter means;

said transition detector means connected to said first and second counter means for applying said clock pulses to said first and then said second counter means until a change is detected in said received digital data for stopping said application of clock pulses to said counters;

output register means connected to said first and second counter means for generating an output signal in the form of a binary word representing the count stored in said first and second counters to be transmitted from said facsimile system;

overflow detector means connected between said first and second counter means for enabling said first counter means and disabling said second counter means until said first counter is filled and then for disabling said first counter and enabling said second counter, whereby said binary word generated by said output register means from said first counter represents the count therein and said binary word generated from said second counter represents a remainder of said count in said first counter.

* * * * *